United States Patent
Mayer et al.

(10) Patent No.: US 9,221,316 B2
(45) Date of Patent: Dec. 29, 2015

(54) CHASSIS ACTUATOR DEVICE FOR A VEHICLE

(71) Applicant: Schaeffler Technologies GmbH & Co. KG, Herzogenaurach (DE)

(72) Inventors: Ralf Mayer, Herzogenaurach (DE); Thomas Dirnberger, Obermichelbach (DE); Alois Friedrich, Dinkelsbuhl (DE); Manfred Kraus, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/243,983

(22) Filed: Apr. 3, 2014

(65) Prior Publication Data
US 2014/0300066 A1    Oct. 9, 2014

(30) Foreign Application Priority Data
Apr. 4, 2013   (DE) .......................... 10 2013 205 903

(51) Int. Cl.
*B60G 21/055*    (2006.01)

(52) U.S. Cl.
CPC ...... *B60G 21/0555* (2013.01); *B60G 2206/427* (2013.01)

(58) Field of Classification Search
CPC ........... B60G 21/0555; B60G 21/0556; B60G 2206/427
USPC ................. 280/5.506, 5.508, 5.502, 124.106, 280/124.107
See application file for complete search history.

(56) References Cited

U.S. PATENT DOCUMENTS

| | | | | |
|---|---|---|---|---|
| 3,003,782 A | * | 10/1961 | Hickman | ................ 280/124.106 |
| 5,183,069 A | * | 2/1993 | Berg et al. | ................... 137/15.18 |
| 5,934,696 A | * | 8/1999 | Bloser et al. | ........... 280/124.106 |
| 6,308,972 B1 | * | 10/2001 | Kincad et al. | .......... 280/124.107 |
| 6,641,151 B1 | * | 11/2003 | Zetterstrom | ........... 280/124.107 |
| 8,613,452 B2 | * | 12/2013 | Grau et al. | ................. 280/5.511 |
| 2006/0017251 A1 | | 1/2006 | Taneda | |

(Continued)

FOREIGN PATENT DOCUMENTS

| | | |
|---|---|---|
| EP | 2368730 | 9/2011 |
| EP | 2543528 | 1/2013 |
| WO | WO 2012041556 A2 * | 4/2012 |

OTHER PUBLICATIONS

Smatloch et al., Stabiliser Assembly, Sep. 28, 2011, EPO, EP 2 368 730 A2, Machine Translation of Description.*

*Primary Examiner* — James English
(74) *Attorney, Agent, or Firm* — Volpe and Koenig, P.C.

(57) ABSTRACT

Roll stabilizers as an example for chassis actuators are used for compensating or suppressing rolling movements of a vehicle about its longitudinal axis. Such rolling movements are caused, in particular, when driving around curves due to centrifugal forces. A chassis actuator device is provided, in particular, a roll stabilizer, for a vehicle with a flange connection between an actuator and a stabilization component. A holder-side positive-locking contour is arranged on a holder section of the flange connection and a flange-side positive-locking contour is arranged on a flange. The positive-locking contours together form a positive-locking connection in the circumferential direction about a torsion axis A, and the flange-side positive-locking contour is arranged on a flange-side lateral surface and/or the holder-side positive-locking contour is arranged on a holder-side lateral surface.

6 Claims, 4 Drawing Sheets

(56) References Cited

U.S. PATENT DOCUMENTS

2008/0258412 A1* 10/2008 Kesselgruber ............. 280/5.506
2011/0020569 A1* 1/2011 Hammelmaier et al. .... 428/34.1
2013/0009374 A1 1/2013 Wittmann et al.
2013/0270786 A1* 10/2013 Mayer et al. ........... 280/124.106

* cited by examiner

CHASSIS ACTUATOR DEVICE FOR A VEHICLE

INCORPORATION BY REFERENCE

The following documents are incorporated herein by reference as if fully set forth: German Patent Application No. DE 102013205903.5, filed Apr. 4, 2013.

BACKGROUND

The invention relates to a chassis actuator device.

As one example for chassis actuators, roll stabilizers are used for compensating for or suppressing the rolling movements of a vehicle about the longitudinal axis of the vehicle. Such rolling movements are produced by centrifugal forces, especially when driving around curves. In a passive construction, roll stabilizers can be formed as torsion bars whose free ends are coupled with the wheel suspensions by means of a lever such that, if the wheel suspensions are at different heights, a torsion is generated on the roll stabilizer. In addition, active roll stabilizers are known that have an actuator that can actively apply a torque by stabilizer parts, in order to counteract a rolling movement of the vehicle.

The publication EP 2543528 A2 that forms the closest prior art describes such a roll stabilizer, wherein an actuator for a torsion of the stabilizer parts is arranged between its two stabilizer parts, wherein at least one of the stabilizer parts is provided with a connecting part that transmits the torsion for connecting to the actuator and wherein the connecting part has teeth that are arranged on an end side oriented in the axial direction and are held by mating teeth of the actuator, in order to transmit the torque.

SUMMARY

The invention is based on the objective of providing a functionally reliable roll stabilizer. This problem is solved by a chassis actuator device with one or more features of the invention. Preferred or advantageous embodiments of the invention are given from the following description, claims, and the accompanying figures.

The invention relates to a chassis actuator device, in particular, a roll stabilizer that is suitable and/or designed for a vehicle. In particular, the chassis actuator device is used for the control, in particular, regulation, damping, and/or compensation of a rolling movement of the vehicle about its longitudinal axis.

The chassis actuator device comprises an actuator that is designed for generating a torque about a torsion axis. The actuator has a housing arrangement, wherein the housing arrangement can have a one-part or multiple-part construction. In particular, the actuator has a motor, especially an electric motor or a hydraulic motor that generates the torque and, in addition, a transmission as an option, in particular, speed-changing gearing that converts, in particular, reduces the torque. Preferably, the motor and/or the transmission is arranged in the housing arrangement.

The chassis actuator device comprises at least one stabilization component, preferably two stabilization components, wherein the torque is introduced from the actuator into the stabilization component or components. In particular, the stabilization components are rotated relative to each other by the actuator about the torsion axis in the opposite direction. Thus, for an activation of the actuator, one stabilization component rotates in one circumferential direction and the other stabilization component rotates in the other circumferential direction.

The at least one stabilization component has a flange, wherein the flange is preferably formed as a plate flange and/or as a plate arranged in a radial plane relative to the torsion axis. Preferably the flange has a circular construction in a top view relative to the torsion axis. The flange can be arranged in the center or eccentrically on the stabilization component.

The housing arrangement has a holder section, wherein the holder section preferably forms an end section of the housing arrangement. In particular, the holder section and preferably also the end section and/or the housing arrangement have a sleeve-shaped or tubular construction. In particular, the holder section is realized as a hollow cylindrical section.

The flange and the holder section together form a flange connection that connects the stabilization component to the actuator for introducing the torque into the stabilization component. In particular, the stabilization component and the actuator are locked in rotation with each other by the flange connection.

A holder-side positive-locking contour is arranged on the holder section and a flange-side positive-locking contour is arranged on the flange. In particular, the respective positive-locking contour is locked in rotation, in particular, rigidly connected, to the holder section or to the flange. The positive-locking contours together form a positive-locking connection in the circumferential direction about the torsion axis, so that a rotation of the flange and thus the stabilization component relative to the holder section and thus to the actuator in the circumferential direction about the torsion axis is prevented by a positive-locking fit.

In the scope of the invention it is provided that the flange-side positive-locking contour is arranged on a flange-side lateral surface and/or the holder-side positive-locking contour is arranged on a holder-side lateral surface. The lateral surfaces advantageously run coaxial and/or concentric to the torsion axis. By the lateral surfaces, surfaces for the arrangement of the positive-locking contours are selected that can comprise, in addition to axial end faces for the arrangement of the positive-locking contours—as is known from the prior art cited above—but alternatively or optionally also have surface sections that are oriented at an angle to a radial plane to the torsion axis. In particular, these surface sections are aligned or oriented in the radial direction.

One consideration of the invention is that through the use of lateral surfaces for the arrangement of the positive-locking contours, an alternative or improved torque transfer between the holder section and the flange is realized. The positive-locking contours can be attached far to the outside with respect to the torsion axis when considered in the radial direction, so that a large lever is used in the transmission of the torque and the local loading of the positive-locking connection remains small accordingly. In the design, the positive-locking contours can be elongated or compressed in the axial direction relative to the torsion axis, in order to adjust the loading capacity of the positive-locking connection to the purpose of the application. Thus, a load-appropriate connection between the stabilization component and the actuator and thus a functionally reliable chassis actuator device can be implemented. Another advantage of the positive-locking contour is the small space requirements for the flange connection.

The flange-side lateral surface is formed especially as an outer lateral surface. The holder-side lateral surface is formed especially as an inner lateral surface. The lateral surfaces can be placed directly on the flange and/or holder section, but it is also possible that intermediate elements are provided that are connected to the flange section or holder section and carry the lateral surfaces.

In one preferred construction of the invention, the lateral surface, that is, the holder-side and/or the flange-side lateral surface is formed as an especially straight hollow-cylindrical lateral surface. In this form the flange can move freely in the outer section at least with respect to the positive-locking connection in the axial direction relative to the torsion axis, so that the positive-locking connection is realized independent from an axial fixture of the flange in the holder section. This construction allows the transmission of high torque and also an arbitrary design of the axial fixture of the flange in the holder section.

In an alternative, more preferred embodiment of the invention, the lateral surface is formed as a conical, in particular, tapering lateral surface. The conical lateral surface is advantageously formed by the rotation of a traverse about the torsion axis as a rotational axis, wherein the traverse can be straight or curved. In this embodiment, the lateral surface can have a bulged or arced form. However, it is especially preferred if the lateral surface has a tapering form, in particular, as a straight conical lateral surface. This form has the advantage that when the flange is inserted into the holder section, the holder-side lateral surface simultaneously forms an end stop for the flange-side lateral surface and thus for the flange, wherein due to the shape of the conical lateral surface, on one hand, a self-centering process is realized and, on the other hand, a tolerance-free fixture of the flange in the holder section is realized in the axial direction relative to the torsion axis.

It is especially preferred that the positive-locking contour is formed as teeth, in particular, as knurled teeth. The teeth run in their longitudinal extent, especially in the extent parallel to the tooth flanks or tooth heads, in the same direction relative to the torsion axis and/or in the axial direction relative to the torsion axis. In particular, the teeth are straight teeth. In this form, the flange can be inserted easily into the holder section, wherein flange-side teeth engage in holder-side teeth with a complementary form. Each of the teeth advantageously assumes an angle section in the circumferential direction about the torsion axis between 1° and 10°.

It is preferred to positive the positive-locking connection as far to the outside radially as possible, in order to keep the forces to be transmitted locally small. For this reason it is preferred that a maximum outer diameter of the positive-locking contours is greater than 70%, advantageously greater than 80% of the outer diameter of the holder section and/or the housing arrangement. In an especially preferred way, the rough shape of the housing arrangement is a sleeve-shaped form.

In one preferred construction of the invention, the chassis actuator device has a securing element that tensions the flange in the axial direction relative to the torsion axis against the holder-side positive-locking contour. In particular, the securing element is arranged in the holder section such that the securing element contacts, at least in some sections, an end side of the flange oriented axially and facing away from a housing interior of the actuator. In this way, the securing element secures the flange against falling out from the holder section. A connection active in the axial direction between the flange and holder section is created by the securing element.

In one especially preferred realization of the invention, the securing element is realized as a lock nut that has an external thread, wherein it is additionally provided that the holder section has a matching internal thread in which the lock nut is screwed. For assembly, first the flange is inserted into the holder section and then fixed and secured in the axial direction by screwing the lock nut into the holder section. Here it is especially advantageous that the flange connection is arranged within the housing arrangement, so that the chassis actuator device requires less space in this area due to the compact construction. In an especially preferred way, the lock nut ends flush with the holder section in the axial direction or is even arranged countersunk in the holder section.

In one possible refinement of the invention it is provided that the holder-side positive-locking contour is formed in the holder section. Formed advantageously means that the positive-locking contour is produced through a shaping or cutting process in the holder section. For example, the holder section has, as part of the housing arrangement, an inner, circumferential web in which the positive-locking contour is formed. In particular, the holder section and positive-locking contour have an integral construction.

Alternatively or additionally it is preferred that the flange-side positive-locking contour is formed in the flange. In particular, this is arranged integrally in the flange. The implementation of the flange-side positive-locking contour can likewise be realized as described before by shaping or cutting processes.

It is also possible for the housing arrangement to comprise a housing section mounted on the vehicle and a housing section that can pivot. The holder section can optionally be formed as an end section of the housing section mounted on the vehicle or as an end section of the housing section that can pivot. It is also possible in the scope of the invention that both stabilization components is locked in rotation with the actuator by a positive-locking connection, as was previously described.

In an especially preferred way, the flange, a tube section arranged, in particular, integrally on the flange, and/or the holder section are produced from a ferromagnetic and/or magneto-restrictive material and coded magnetically, so that this forms a primary sensor. This material has the advantage that it can be simultaneously used as a signal transducer. In addition, the chassis actuator device has a secondary sensor, in particular, a magnetic field sensor that is arranged within the flange or the tube section or outside of the flange, in order to detect changes of the magnetic field of the primary sensor. Through the construction of the flange connection according to the invention, it is not necessary that a non-weldable material is used for the flange or the holder section, so that a material matched to the sensors can also be used.

Through the chassis actuator device, a secure, simple, and relatively cost-effective solution for the torque transfer from an actuator to a stabilization component and in the opposite direction can be provided that simultaneously requires little installation space and makes simple production steps possible. Furthermore, the flange connection is formed so that it is detachable in a non-destructive way, so that the flange connection is reusable, e.g., in repair or maintenance work.

BRIEF DESCRIPTION OF THE DRAWINGS

Additional features, advantages, and the effect of the invention can be found in the following description of preferred embodiments of the invention, as well as the accompanying figures. Shown here are.

DETAILED DESCRIPTION OF THE PREFERRED EMBODIMENTS

Figure 1:
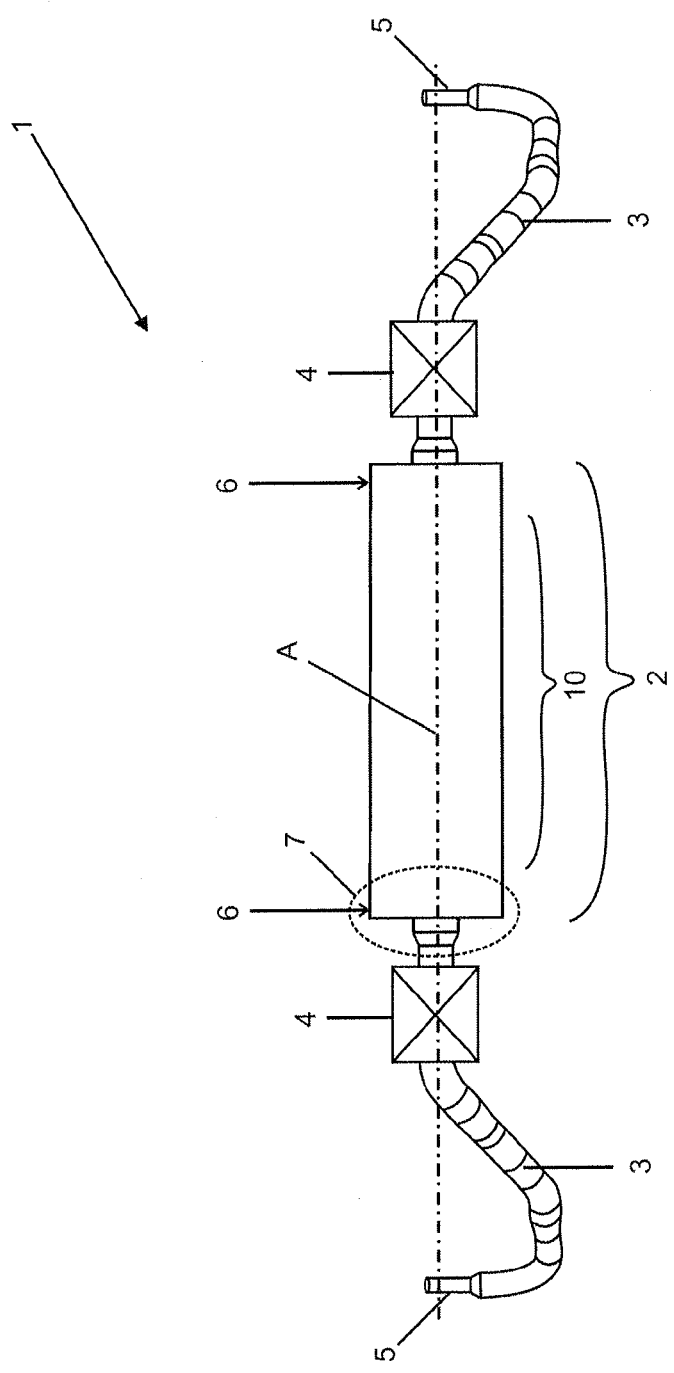
FIG. 1 a schematic top view of a roll stabilizer as an embodiment of the invention, FIG. 2 in a three-dimensional figure, a detail view of the individual parts in the area of the flange connection of the roll stabilizer of FIG. 1, FIG. 3 a schematic longitudinal section view through the flange connection of FIG. 2, and FIG. 4 a partially sectioned three-dimensional view of the flange connection of the preceding FIGS. 2 and 3.

FIG. 1 shows, in a greatly schematized view, a roll stabilizer 1 that is designed for a vehicle. The roll stabilizer 1 is mounted perpendicular to the vehicle longitudinal direction and essentially parallel to the base of the vehicle and is used to damp rolling movements about the longitudinal axis of the vehicle.

The roll stabilizer 1 has an actuator 2 and two stabilization components 3 connected to the actuator 2. The stabilization components 3 are supported so that it can rotate or pivot by bearing devices 4 relative to the vehicle. The stabilization components 3 are optionally formed as torsion bars and have, at their free ends, interfaces 5, in this case, passage openings for connection, for example, to a wheel suspension system of the vehicle.

The actuator 2 is formed as an electromechanical actuator and has a housing arrangement 10 for holding the eletromechanical components, such as an electric motor and transmission, wherein the actuator 2 is locked in rotation on each side with an end section 6 with one of the stabilization components 3. The actuator 2 is formed in order to rotate its two free end sections 6 through application of a torque about a torsion axis A opposite each other, in order to actively transmit in this way a torque, for example, to the wheel suspension systems via the stabilization components 3, in order to control, in particular, damp a rolling movement of the vehicle. For example, the actuator 2 comprises the electric motor and the transmission, wherein an end section of the actuator 2 is connected to the electric motor and the other end section of the actuator is connected to a transmission output and wherein the electric motor is in active connection with the transmission, so that the torque of the electric motor is transmitted as a reduced torque to the end sections 6. The coupling between the end sections 6 of the actuator 2 and the stabilization components 3 is realized by a flange connection 7. In this way it is possible that both stabilization components 3 are connected to the actuator 2 by a flange connection 7 such that only one of the stabilization components 3 is connected to the actuator 2 via the flange connection 7 and the other stabilization component 3 is connected differently to the actuator 2.

Figure 2:
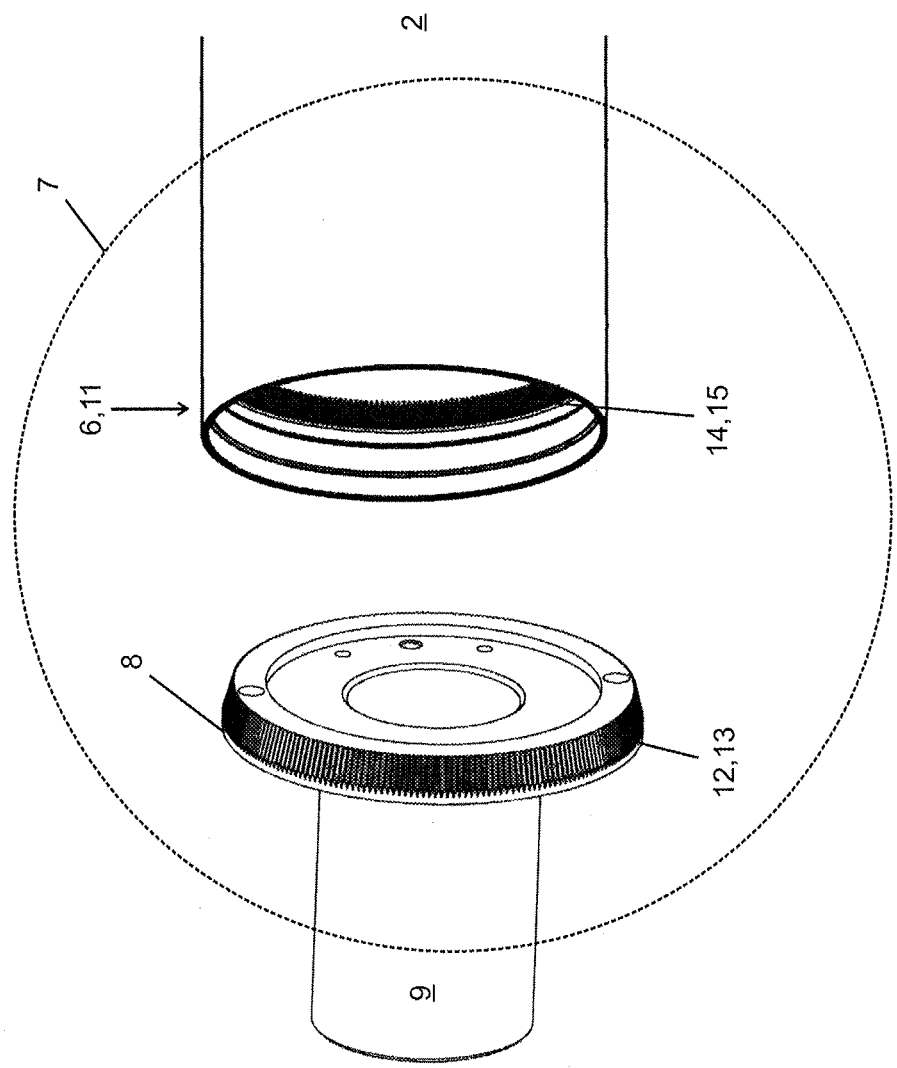

In a schematic three-dimensional detail view, FIG. 2 shows the flange connection 7. On the free end, the stabilization component 3 has a plate-shaped flange 8 that is locked in rotation on the stabilization component 3. The stabilization component 3 can be formed integrally with the flange 8, but it can also be provided that the flange 8 or—as shown in FIG. 2—a tubular section 9 and the flange 8 are formed as a common part that is placed on the stabilization component 3. On the right side, the sleeve-shaped end section 6 of the housing arrangement 10 of the actuator 2 is shown that forms a holder section 11 and thus likewise has a sleeve-shaped design. In particular, the holder section forms an output device of the actuator 2 for the torque.

The flange 8 has, on a flange-side lateral surface 12, flange-side positive-locking contours 13. In contrast, the holder section 11 has, on its inside, a holder-side lateral surface 14 with a holder-side positive-locking contour 15. The flange-side lateral surface 12 is formed as a conical lateral surface, wherein the outer diameter of the lateral surface 12 on the side facing away from the actuator 2 is greater than the outer diameter on the side facing the actuator 2. The holder-side lateral surface 14 is likewise formed as a conical lateral surface, but here as an inner lateral surface, wherein the cone angle of the lateral surface 15 is equal to the cone angle of the lateral surface 13.

The flange-side and holder-side positive-locking contours 12, 14 are each formed as teeth, in particular, as knurled teeth. Viewed in the radial direction, the teeth run aligned to the torsion axis A.

In one combination of the stabilization component 3 and the actuator 2, wherein the flange 8 is pushed into the holder section 11, a positive-locking connection is produced in the circumferential direction about the torsion axis A between the flange-side positive-locking contours 13 and the holder-side positive-locking contours 15.

Figure 3:
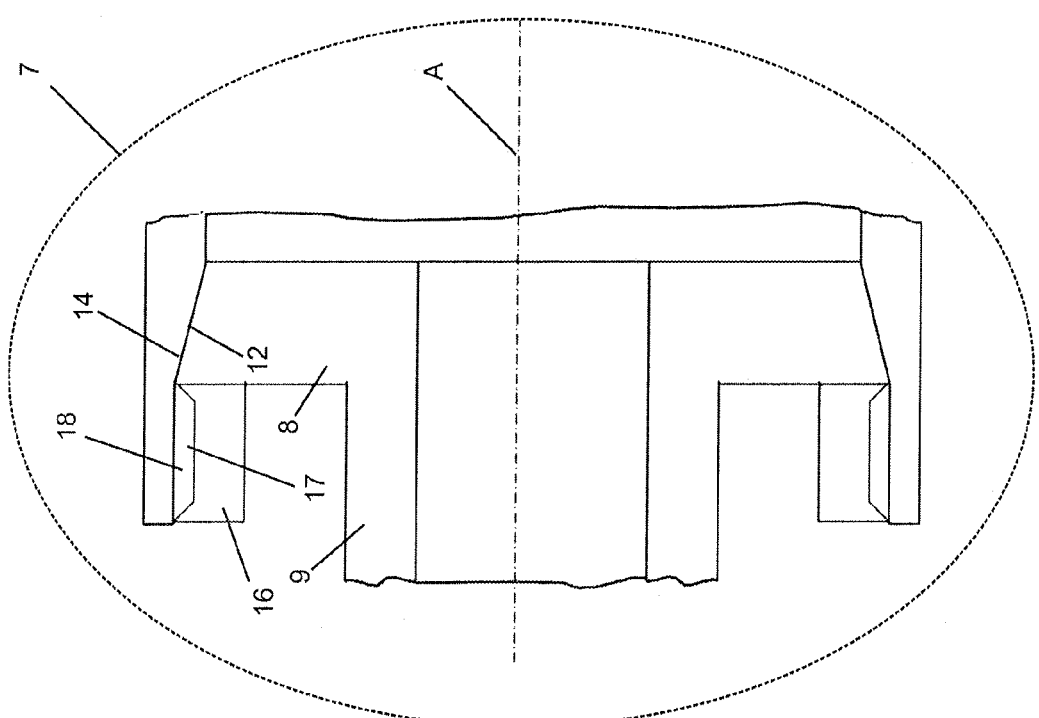

In FIG. 3, a schematic longitudinal section along the torsion axis A of the flange connection 7 is shown. From the diagram it can be seen that the cone angle of the flange-side lateral surface 12 and the holder-side lateral surface 14 are equal, so that these are in line relative to each other in the shown longitudinal section.

For securing the flange 8 in the holder section 11, the roll stabilizer 1 has a lock nut 16 that assumes the function of a securing element and/or fixing element for the flange 8 on the holder section 11. The lock nut 16 has an external thread 17 that can be screwed into an internal thread 18 of the holder section 11. By screwing in the lock nut 16, the flange 8 is pushed into the actuator 2 in the axial direction relative to the torsion axis A, so that the positive-locking contours 13 and 15 engage in a positive-locking fit. Through the conical construction of the lateral surfaces 12 and 14, a tolerance-free fixing of the flange 8 in the holder section 11 is realized. To be noted here is that the lock nut 16 ends flush with the holder section 11 or is even inserted into this section, so that the installation space is very small.

Figure 4:
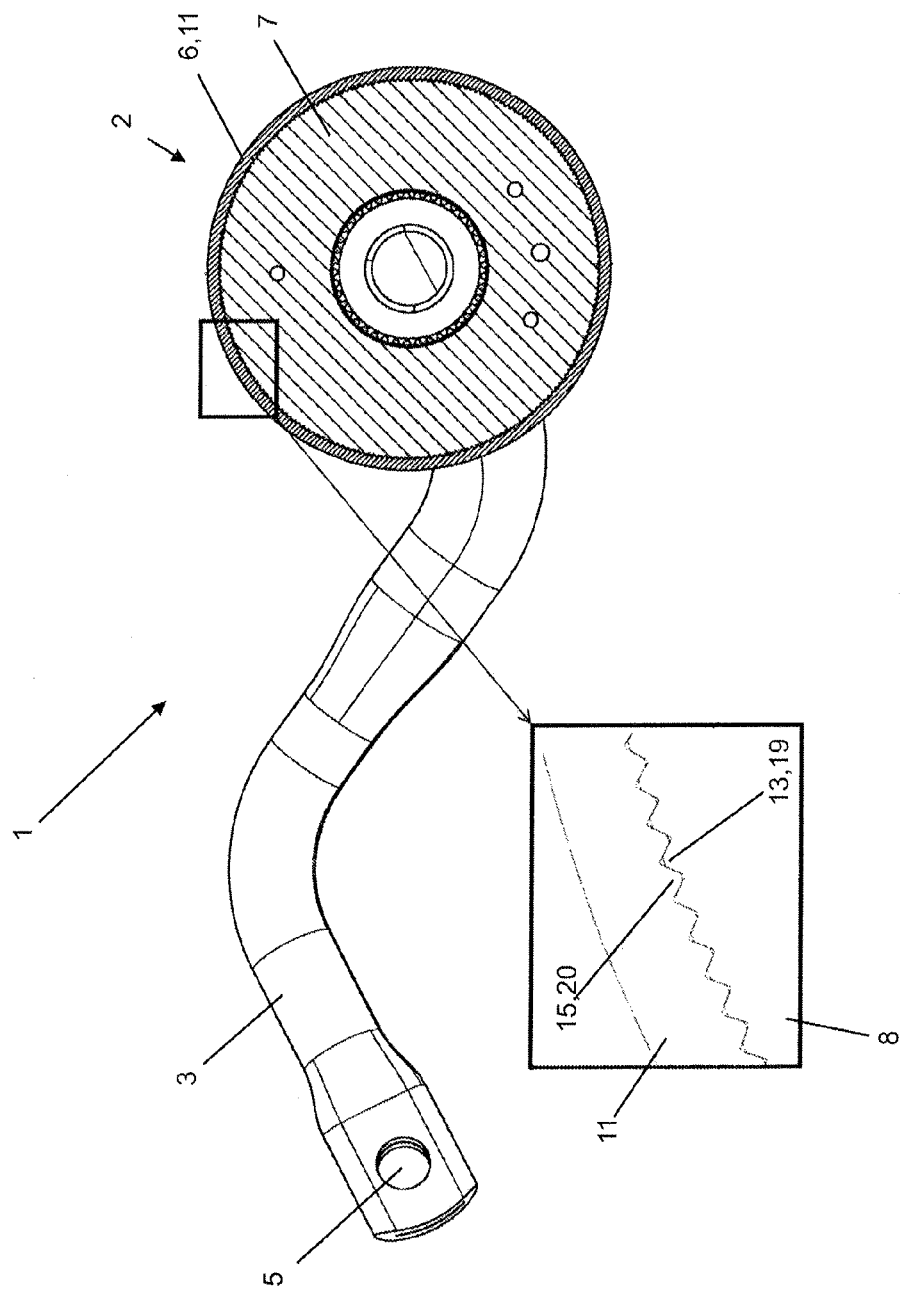

Finally, in FIG. 4, a cross section through the flange connection 7 is shown, wherein, in a detail enlargement, the meshing triangular cross-section teeth 19, 20 of the flange-side positive-locking contours 13 and of the holder-side positive-locking contours 15 can be seen. For example, the teeth 19, 20 assume an angle range between one degree and ten degrees.

In other embodiments, the tubular section 9 and thus also the flange 8 are formed from a ferromagnetic, in particular, magneto-restrictive material and coded magnetically and thus form a primary sensor. Furthermore, the roll stabilizer 1 comprises a magnetic field sensor as a secondary sensor that is arranged, e.g., in the tubular section 9. The secondary sensor detects changes of the magnetic field of the primary sensor that are produced by the loading of the primary sensor due to the applied torque. A downstream evaluation device can evaluate the measured magnetic field changes and from these changes the current torque can be determined as the ACTUAL variable of the roll stabilizer 1. The ACTUAL variable is further processed for control, regulation, and/or inspection purposes, in order to control the roll stabilizer 1 according to the situation.

LIST OF REFERENCE NUMBERS

1 Roll stabilizer
2 Actuator
3 Stabilization components
4 Bearing devices
5 Interfaces
6 End sections
7 Flange connection 8 Flange
9 Tube section
10 Housing arrangement
11 Holder section
12 Flange-side lateral surface
13 Flange-side positive-locking contours
14 Holder-side lateral surface
15 Holder-side positive-locking contours
16 Lock nut
17 External thread
18 Internal thread
19 Teeth
20 Teeth
A Torsion axis

The invention claimed is:

1. A chassis actuator device for a vehicle, comprising
an actuator for generating a torque about a torsion axis, the actuator has a housing arrangement,
at least one stabilization component having a flange, and the housing arrangement has a holder section, the flange and the holder section together form a flange connection that connects the stabilization component to the actuator,
a holder-side positive-locking contour arranged on the holder section and a flange-side positive-locking contour arranged on the flange, the holder-side positive-locking contour and the flange-side positive-locking contour together form a positive-locking connection in a circumferential direction about the torsion axis, and
wherein at least one of the flange-side positive-locking contour is arranged on a flange-side lateral surface or the holder-side positive-locking contour is arranged on a holder-side lateral surface, and the flange-side lateral surface and the holder-side lateral surface are each formed as a frusto-conical lateral surface, and comprising a securing element that presses the flange in an axial direction relative to the torsion axis against the holder-side positive-locking contour, wherein the securing element is formed as a lock nut with an external thread, and the holder section has an internal thread onto which the lock nut is screwed, the frusto-conical lateral surface of the flange-side lateral surface is defined by a first axial end and a second axial end, the second axial end has a larger outer diameter than the first axial end, and the lock nut is arranged against the second axial end of the flange-side lateral surface.

2. The chassis actuator device according to claim 1, wherein at least one of the flange-side lateral surface or the holder-side lateral surface is formed as a hollow cylindrical lateral surface.

3. The chassis actuator device according to claim 1, wherein at least one of the flange-side positive-locking contour or the holder-side positive-locking contour is formed as teeth.

4. The chassis actuator device according to claim 1, wherein a maximum outer diameter of the positive-locking contours is greater than 70% of an outer diameter of at least one of the holder section or the housing arrangement.

5. The chassis actuator device according to claim 1, wherein at least one of the holder-side positive-locking contour is formed in the holder section or the flange-side holder contour is formed in the flange.

6. The chassis actuator device according to claim 1, wherein a material of at least one of the flange or the holder section is formed as a ferromagnetic material and/or as a magneto-restrictive material and forms a primary sensor, and that the chassis actuator device has a secondary sensor that detects changes of a magnetic field of the primary sensor and outputs sensor signals, and the chassis actuator device determines a current torque using the sensor signals.

* * * * *